United States Patent
Felps

(10) Patent No.: US 8,958,956 B1
(45) Date of Patent: Feb. 17, 2015

(54) BATTERY SUPERVISOR SYSTEM HAVING SMART WINCH CONTROL

(71) Applicant: Jimmie Doyle Felps, Colorado Springs, CO (US)

(72) Inventor: Jimmie Doyle Felps, Colorado Springs, CO (US)

(73) Assignee: Jimmie Doyle Felps, Colorado Springs, CO (US)

( * ) Notice: Subject to any disclaimer, the term of this patent is extended or adjusted under 35 U.S.C. 154(b) by 0 days.

(21) Appl. No.: 14/202,523

(22) Filed: Mar. 10, 2014

(51) Int. Cl.
B66D 1/12 (2006.01)
B66D 1/40 (2006.01)
B66D 3/26 (2006.01)

(52) U.S. Cl.
CPC ........................................ *B66D 3/26* (2013.01)
USPC ............................................ 701/49; 254/362

(58) Field of Classification Search
CPC ...... G06F 17/00; B60K 28/00; B60G 17/015; B60Q 1/122; B60P 1/00; B60P 1/5571; E05D 15/58; G05B 15/02
See application file for complete search history.

(56) References Cited

U.S. PATENT DOCUMENTS

| | | | |
|---|---|---|---|
| 3,395,288 A | 7/1968 | Von Brimer | |
| 3,646,354 A | 2/1972 | Von Brimer | |
| 4,039,903 A | 8/1977 | Russell | |
| 4,080,560 A | 3/1978 | Abert | |
| 4,331,323 A * | 5/1982 | Sekimori et al. | 254/323 |
| 4,493,001 A | 1/1985 | Sheldrake | |
| 4,873,474 A | 10/1989 | Johnson | |
| 4,902,956 A | 2/1990 | Sloan | |
| 5,089,762 A | 2/1992 | Sloan | |
| 5,136,230 A | 8/1992 | Gayler | |
| 5,140,250 A | 8/1992 | Morland | |
| 5,200,877 A | 4/1993 | Betton et al. | |
| 5,214,359 A | 5/1993 | Herndon et al. | |
| 5,272,380 A | 12/1993 | Clokie | |
| 5,321,389 A | 6/1994 | Meister | |
| 5,648,887 A | 7/1997 | Herndon et al. | |
| 6,037,749 A | 3/2000 | Parsonage | |
| 6,046,893 A | 4/2000 | Heravi | |
| 6,242,891 B1 | 6/2001 | Parsonage | |
| 6,864,650 B2 | 3/2005 | Heravi et al. | |
| 7,262,947 B2 | 8/2007 | Heravi et al. | |
| 7,791,310 B2 | 9/2010 | Luz et al. | |
| 7,898,219 B2 | 3/2011 | Felps | |
| 8,076,885 B2 | 12/2011 | Heravi et al. | |
| 8,213,137 B2 | 7/2012 | Fregoso | |

* cited by examiner

*Primary Examiner* — James Trammell
*Assistant Examiner* — Demetra Smith-Stewart

(57) ABSTRACT

A battery supervisor system having an integral smart winch controller is provided for a vehicle equipped with an electric winch system and especially for off-road vehicles such as all-terrain-vehicles (ATVs), utility-task-vehicles (UTVs). and extreme-terrain-vehicles (XTVs) which are generally equipped with small batteries. The purpose of this invention is to prevent over discharge of the vehicle battery to a point where it would be difficult or impossible to start the vehicle engine and to prevent damage to the electric winch system, either of which has the potential of stranding an operator in a remote area. The battery supervisor monitors the state-of-charge of the vehicle's battery to automatically control the power to the winch and the vehicle's accessory loads. In addition, the smart winch controller takes a unique approach to protecting the winch by controlling the short term pulse (or pulses) of energy delivered to the winch and by forcing a fixed off time for the winch system to cool down, in lieu of trying to determine if components in the winch system are experiencing excessive temperatures and then turning the winch off.

24 Claims, 14 Drawing Sheets

BATTERY SUPERVISOR BLOCK DIAGRAM

BIAS & PROTECTION

SMART WINCH CONTROL

CURRENT SENSE & CONTROL

VOLTAGE MONITOR & DUAL TIMER

SENSE RESISTOR, 250u OHMS

INTEGRATOR TIMING 1

INTEGRATOR TIMING 2

| STATUS | LED | | | COLOR | ACCESSORY DRIVE | WINCH DRIVE |
|---|---|---|---|---|---|---|
| | R | G | B | | | |
| 1 | ON | OFF | OFF | RED | ON, BUT NEGATIVE VOLTAGE | ON, BUT NEGATIVE VOLTAGE |
| 2 | OFF | ON | OFF | GREEN | ON | ON |
| 3 | OFF | ON | ON | AQUA | ON | OFF |
| 4 | OFF | OFF | OFF | NONE | OFF | OFF |
| 5 | ON | OFF | ON | PURPLE | LATCHED OFF | OFF |
| 6 | ON | OFF | OFF | RED | LATCHED OFF | ON |
| 7 | OFF | ON | ON | AQUA | ON | LATCHED OFF |

LED STATUS VS. OUTPUT DRIVES

FIG. 14

BATTERY SUPERVISOR SYSTEM HAVING SMART WINCH CONTROL

FIELD OF THE INVENTION

The present invention relates generally to motor vehicle electrical systems, and more specifically, to a control system that incorporates a battery supervisor having an integral smart winch controller for driving an electric winch system.

BACKGROUND OF THE INVENTION

Rechargeable lead-acid batteries have become the standard energy source used for starting motor vehicles and powering various electrical loads on the vehicle. If this battery is allowed to be discharged to a very low state-of-charge (SOC), the operator may be unable to start the vehicle engine. The problem is exacerbated when a high current load such as an electric winch is operated, whether or not the vehicle engine is running. Repeated, deep discharging a battery will also reduce the number of charge/discharge cycles the battery can perform and may even permanently damage the battery. Many efforts have been made to avoid over discharge of a vehicle battery and examples are commonly assigned U.S. Pat. No. 3,395,288 (Von Brimer), U.S. Pat. No. 3,646,354 (Von Brimer), U.S. Pat. No. 4,039,903 (Russell), U.S. Pat. No. 4,080,560 (Abert), U.S. Pat. No. 4,493,001 (Sheldrake), U.S. Pat. No. 4,902,956 (Sloan), U.S. Pat. No. 5,089,762 (Sloan), U.S. Pat. No. 5,136,230 (Gayler), U.S. Pat. No. 5,140,250 (Morland), U.S. Pat. No. 5,200,877 (Betton, et al.), U.S. Pat. No. 5,272,380 (Clokie), U.S. Pat. No. 5,321,389 (Meister), U.S. Pat. No. 6,037,749 (Parsonage), U.S. Pat. No. 6,242,891(Parsonage), U.S. Pat. No. 7,262,947 (Heravi, et al.), U.S. Pat. No. 7,791,310 (Luz, et al.) and U.S. Pat. No. 7,898,219 (Felps). The invention disclosed in U.S. Pat. No. 7,898,219 by Felps has proven itself to perform well in "real world" applications and is the basis for the present disclosure.

The need for a smart winch controller becomes apparent when one experienced in the art realizes an electric winch can draw up to hundreds of amperes (A) of current, which can quickly drain a battery. Even with the vehicle engine is running, the alternator will seldom be able to deliver sufficient current to maintain the battery's charge. This is especially true in small off-road vehicles such as all-terrain-vehicles (ATVs), utility-task-vehicles (UTVs) and extreme-terrain-vehicles (XTVs) that typically have small batteries with low ampere-hour (AH) ratings (generally ranging from 15 to 45 AH) and low output alternators (generally 40 A and sometimes much less). This is not as much of a problem on larger vehicles such as sport-utility-vehicles (SUVs), large 4-wheel drive pickups and trucks that have high output alternators. But even then, some of these vehicles have electric winches with much higher pull ratings; and therefore, much higher winch current requirements. Another problem is at the high load currents winches can draw, the AH rating of the battery is significantly reduced (as much as 35% or more) because of the Peukert effect (a measure of how well a battery holds up under heavy loads). An ATV/UTV/XTV winch rated at 4500 to 5000 pounds (lbs.) can draw as much as 330 A of current. The SOC on a 28 AH battery delivering 85 A of current can drop by more than 19% in 2.5 minutes. So care must be exercised to preserve the battery's SOC when a winch is being operated. Battery choice for off-road vehicles is very important because their environment can be extreme and those equipped with an electric winch place special demands on the battery. An absorbed-glass-matt (AGM), lead-acid battery is best since it is more rugged than a flooded, lead-acid battery. The Odyssey line of AGM batteries seem to be in a "league all their own" since their batteries can be purchased with a metal casing (for high heat applications), have extreme vibration resistance, have a higher energy density than spiral wound batteries and are certified as "dry cell" (for shipping and mounting purposes).

A second reason for needing a smart winch controller is that winch manufacturers generally design vehicle electric winches for intermittent use. The reason for this is to keep the size, weight and cost to a minimum. But, continuous use of these winches will result in overheating of the motor windings, synthetic rope, relays, wiring and wiring connections. A difficulty in solving that problem is that winch manufacturers are inconsistent about rating the cycle times of their winches. Most adhere to a 15 minute cycle time, but some rate fixed off times that can be as little as 10 minutes. The off time is to allow the winch time to cool down. Most specify a maximum on time of 2.5 minutes for any level of winch current and a maximum on time of 10 to 45 seconds at the maximum rated winch current. The specifications for winches include the maximum pull rating in lbs. for the first layer of wire rope on the winch drum and the maximum current the winch requires for pulling that weight. This maximum current rating can be used for controlling the winch. In practice, few operators use their winches when they are unwound to the first layer and they might be pulling on something that won't move (e.g. removing a tree stump). And, under these conditions, it is easy to overload the winch (i.e. sudden excessive current).

Various attempts have been made to prevent damage to an electric winch. Some examples of these winch controllers are: U.S. Pat. No. 4,873,474 (Johnson) and U.S. Pat. No. 6,046,893 (Heravi), all having some form of current limiting; U.S. Pat. No. 5,214,359 (Herndon, et al.), having current limiting and thermal protection (in the relay module used for winch direction); U.S. Pat. No. 8,076,885 (Heravi, et al.), having current limiting and under voltage protection; and, U.S. Pat. No. 6,864,650 (Heravi, et al.) and U.S. Pat. No. 8,213,137 (Fregoso), both being much more complex and having current limiting, under voltage protection, over temperature protection as well as other protection features. U.S. Pat. No. 5,648,887 (Herndon, et al.) has a complex current limit protection feature that takes into account multiple states of winch operation (including detecting the battery voltage) to adjust the current limit feature. Herndon addresses excessive energy delivered to a winch but fails to address the time required for the winch to cool down after normal winch use. All of these inventions provide different methods and levels of protection for the winch system and a controller to perform these functions, but all fail to address the maximum duty cycle rating of the winch, the minimum cycle time and the SOC of the battery. The patents that do monitor the battery voltage (except U.S. Pat. No. 5,648,887), have a single, minimum voltage limit that is not compensated for the internal resistance of the battery. In U.S. Pat. No. 8,213,137, Fregoso mentions "current vs time readings" in both his ABSTRACT and DETAILED DESCRIPTION OF THE INVENTION, but makes no CLAIMS about the phrase. Certainly it is advantageous not to damage the winch system, but either a dead battery or a damaged winch system has the potential of stranding an operator in a remote area.

SUMMARY OF THE INVENTION

In a preferred embodiment of the present invention, the dual output version of the on-board battery supervisor in prior invention, U.S. Pat. No. 7,898,219 (Felps), has been modified to perform a winch drive function. Modifications include replacing the trolling motor output with a winch drive output (along with its smart controller) plus other performance improvements. The two outputs, accessory drive and winch drive, are automatically switched off when the state-of-charge (SOC) of the 12 volt, absorbed-glass-mat (AGM) lead-acid, vehicle battery decreases to a predetermined threshold and back on when the SOC increases a predetermined amount. Monitoring of the vehicle's battery voltage and the total battery current (discharging or charging) are used to determine the SOC of the battery. This feature is disabled during the time the winch drive is delivering current to the winch (i.e. winch on time). The reason for disabling the SOC measurement during winch on time is because of the difficulty in predicting the resistance (at such high currents) internal to the battery, of the wiring, of the electrical connections and of the relays. Therefore, the battery supervisor must determine, beforehand, if sufficient energy (typically greater than 42% SOC) remains in the battery to allow a winch on cycle. The SOC of the battery is monitored at all times during winch off time.

The preferred embodiment of the present invention takes a completely different approach for providing protection to the electric winch system. Rather than try to determine if components in the winch system are overheating and then turning the winch off, the present invention only provides energy to the winch system that is specified not to cause overheating in the first place. One experienced in the art knows that applying a term called "$I^2T$" is one of the best means of limiting short term, pulse (or pulses) energy to an electric motor that is subject to overheating. Simply measuring the increase in resistance of the motor winding does not detect hot spots in the winding. In the term "$I^2T$", the "I" is the current delivered to the winch motor and the "T" is the amount of time it is delivered. It can be noted that if the current "I" is doubled, the "$I^2T$" term increases by a factor of 4. For example, if a winch is specified for a maximum current of 330 A for 10 seconds, then its "$I^2T$" is 1,089,000; it can draw 165 A for 40 seconds and 85.2 A for 2.5 minutes. Therefore; to limit the maximum pulse energy going to the winch, the preferred embodiment of the present invention uses an instantaneous, power monitor, integrated circuit (IC) to "square" the winch current to determine the allowable winch on time, having a maximum winch on time of 10 seconds at maximum winch current, a maximum on time of 150 seconds (2.5 minutes) at any winch current level and a fixed, forced winch off time of 15 minutes. The fixed, forced winch off time occurs immediately following a maximum winch on time event. SOC monitoring is enabled during this forced off time.

Even if the operator is manually switching the winch off and on as he or she monitors the winch wire rope and the load (a common practice), the present invention keeps track of the total of the on times and off times to determine if and when a forced off time needs to occur.

Additional protection features are still required during winch on time. The battery is monitored for excessive voltage dip and the winch is monitored for excessive current. If either event occurs, the winch is cycled off for 4 seconds.

To match the winch and the battery to the present invention, the operator must make a one-time adjustment (based upon manufacturer's specifications) for maximum winch current and for battery ampere-hour (AH) rating.

The output, intelligent switch ICs provide short circuit and over temperature protection for the output drives.

BRIEF DESCRIPTION OF THE DRAWINGS

The drawings presented in the present disclosure provide a better understanding of the present invention, but are not intended to limit the scope or use of the invention. The components in the drawings do not necessarily adhere to conventional symbols, emphasis being placed upon clearly illustrating the principles of the present invention. Moreover, in the drawings, like reference numerals designate corresponding parts throughout the several views and in which:

FIG. 14 is a table that shows the status of the accessory and winch drive outputs of the battery supervisor in FIG. 1 via the red-green-blue (RGB) LED in FIG. 8.

DETAILED DESCRIPTION OF THE INVENTION

The present disclosure describes how this preferred embodiment of the present invention operates, but is not intended to limit the scope, other applications or uses of the present invention. The present disclosure is primarily for all-terrain-vehicles (ATVs), utility-task-vehicles (UTVs) and extreme-terrain-vehicles (XTVs), but is not limited to these vehicles or limited in its chosen output current or voltage capabilities. Battery supervisor 12 in FIG. 1 consists of a printed circuit board (PCB) assembly with all components being surface mount devices (SMDs) and with the PCB being attached to a heat sink (not shown) with electrical isolation and thermal conduction being provided via a thermal pad (not shown). The heat sink is oversized to minimize temperature rise. In this preferred embodiment, the present invention is integrated into a single unit, battery supervisor 12, except for current sense resistor 18 in FIG. 1. This approach lends itself to "after market" applications, but one might choose to place part of the circuitry internal to the winch in new designs.

Since this invention is for a vehicle application, all devices should be rated to withstand an automotive temperature range of at least −40 to +125° C.

Figure 1:
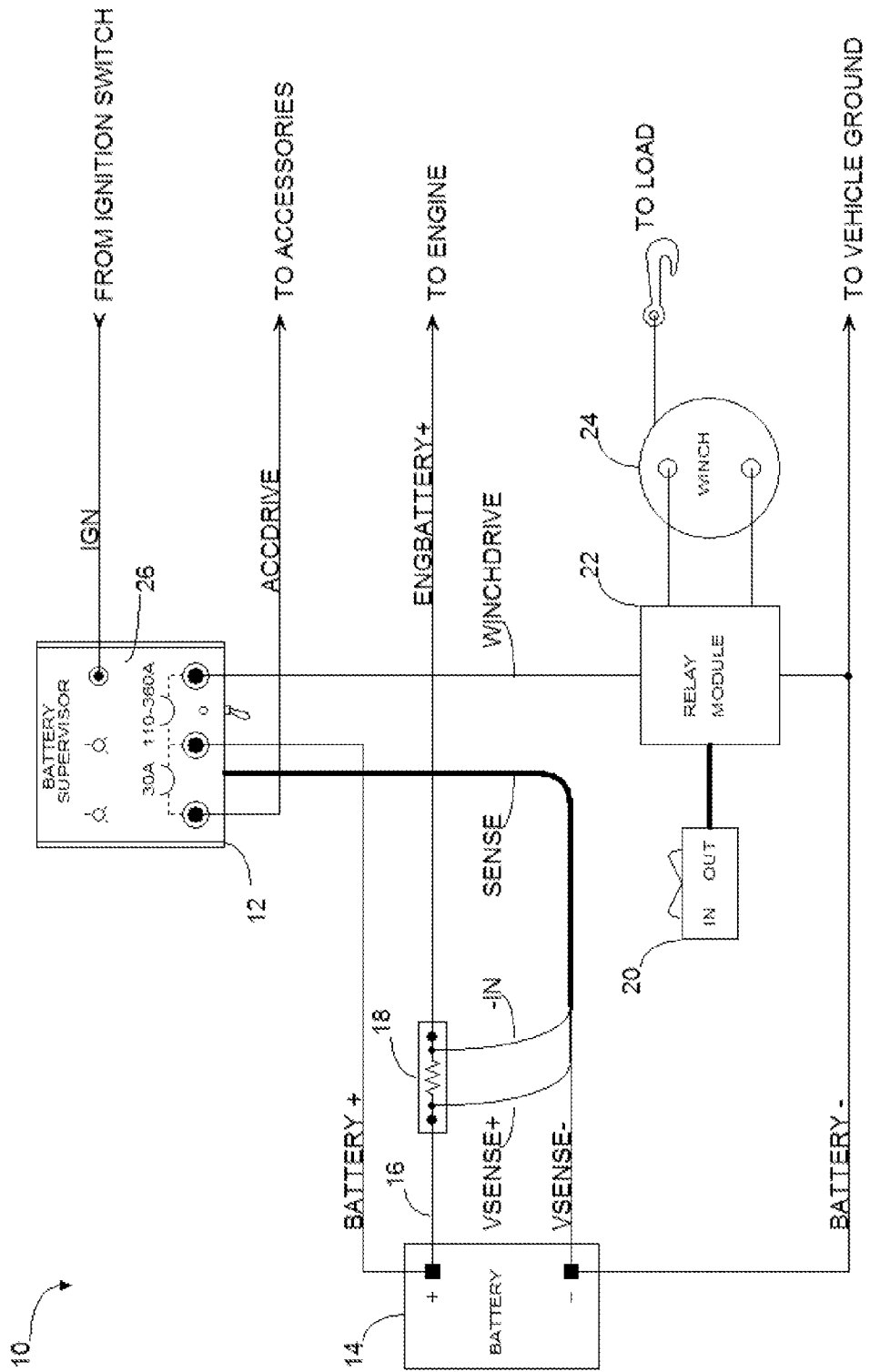
FIG. 1 is a simplified schematic of a typical vehicle electrical system equipped with an electric winch that is being driven by a preferred embodiment of the present invention comprising a battery supervisor and a current sense resistor.

To begin, refer to FIG. 1, which represents a typical vehicle electrical system having a battery 14 (AGM, Odyssey PC925 recommended), a battery supervisor 12, an engine current sense resistor 18 (250μΩ, refer to FIG. 9), an electric winch 24, a winch 24 reversing, relay module 22 and a momentary control switch 20 (that turns winch 24 on and off for in or out operation). An ATV application will often have two momentary control switches (similar to switch 20) with the second switch being mounted on the handlebars of the ATV. The handlebar switch (not shown) often has an ignition connection that can be connected to WINCHDRIVE to reduce ignition switch current. Connection 16 works best if resistor 18 is bolted directly to the positive terminal on battery 14. A short brass spacer may be required to mount resistor 18 on the top of battery 14 and out of the way. Battery supervisor 12 monitors the voltage of battery 14, internally monitors the current of the accessory drive and monitors the engine current (charging or discharging) via current sense resistor 18 so as to properly control (turn off and on) ACCDRIVE and WINCHDRIVE outputs to prevent over discharge of battery 14. In addition, battery supervisor 12 also internally monitors winch 24 drive current for use in controlling winch 24. The preferred way to power battery supervisor 12 is from the engine ignition switch (IGN) that connects to a terminal on battery supervisor 12. Total bias current is typically 17 mA with the outputs on and typically <200 μA in the idle state (ignition switch and battery supervisor 12 switch off). Label 26 provides information for the connections, adjustments and the circuit breakers of battery supervisor 12.

Figure 2:
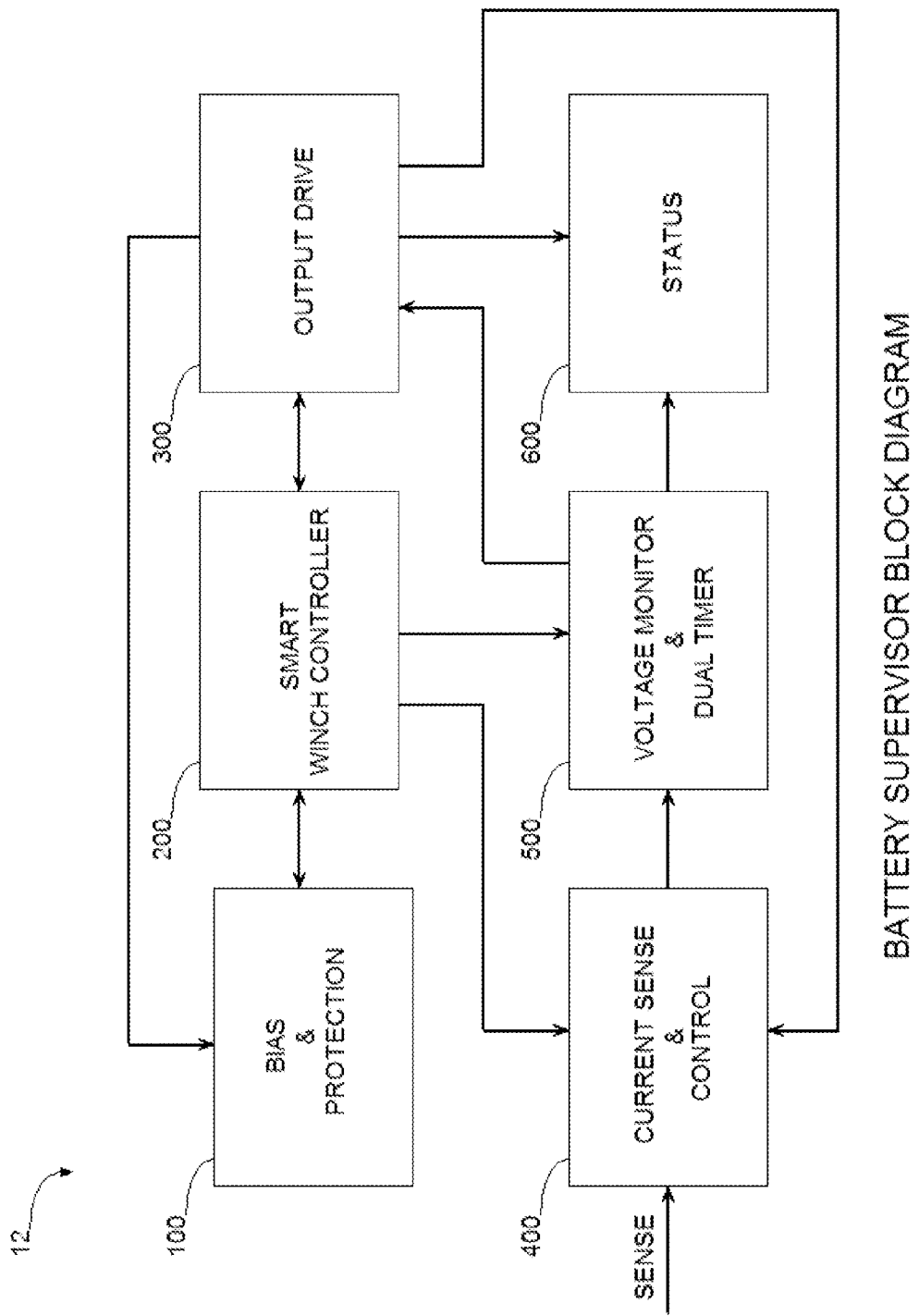
FIG. 2 is a block diagram of the battery supervisor in FIG. 1 showing the six smaller functional blocks and their interconnecting signals.

Referring to FIG. 2, BATTERY SUPERVISOR BLOCK DIAGRAM, this block diagram shows the six main circuit blocks 100, 200, 300, 400, 500 and 600 that make up battery supervisor 12 in FIG. 1, each to be described in more detail, later.

Figure 3:
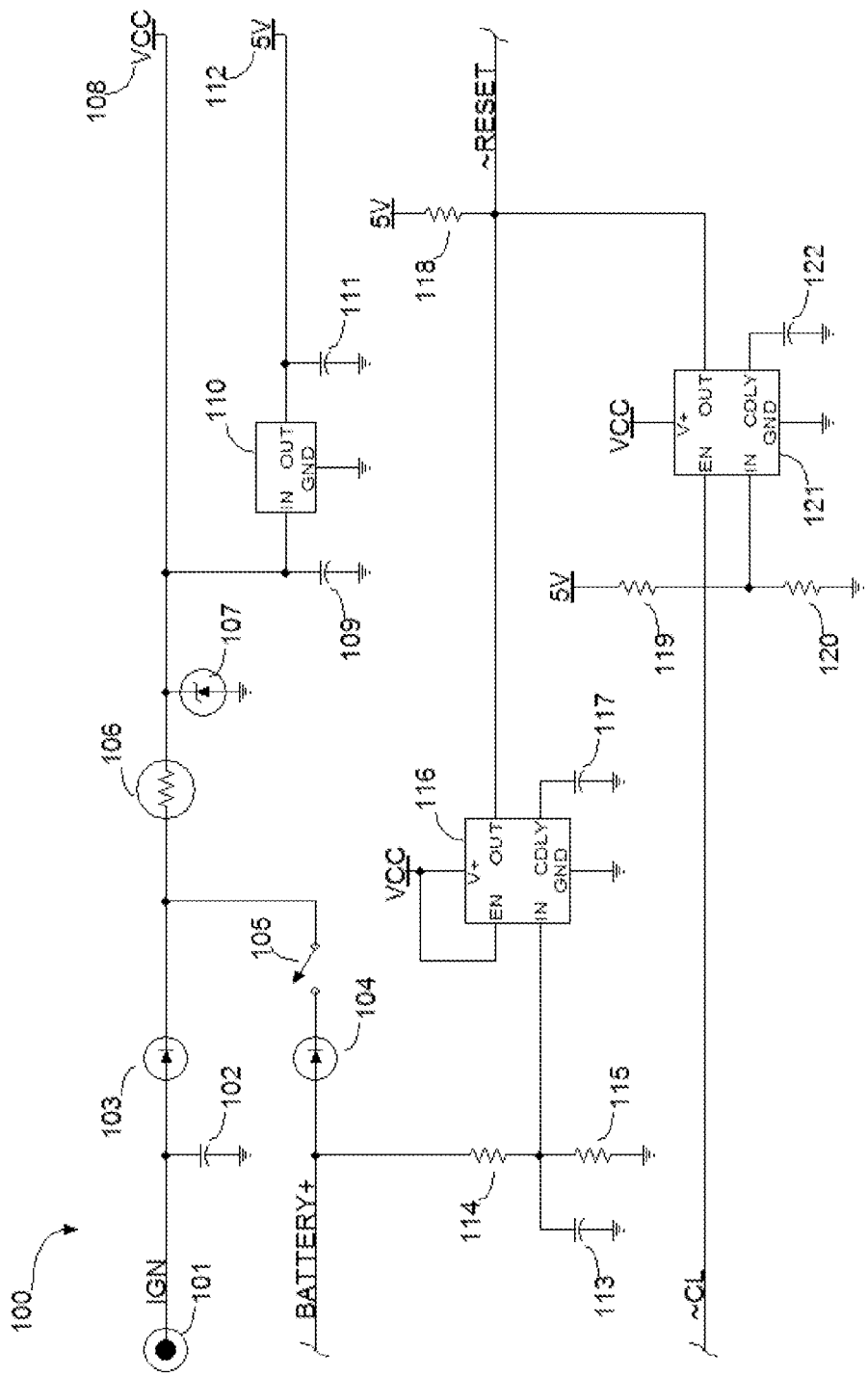
FIG. 3 is a schematic of the bias and protection circuitry in the block diagram in FIG. 2.

Referring to FIG. 3, BIAS & PROTECTION 100, it can be seen that power to bias battery supervisor 12 in FIG. 1 comes from one of two sources, the threaded, ignition terminal 101 through diode 103 (⅓ of IMN10) or from battery 14 in FIG. 1 via BATTERY+, diode 104 (⅓ of IMN10) and switch 105. It is always preferred that the engine be running when winch 24 in FIG. 1 is operated. Therefore, switch 105 is normally off to minimize battery 14 current drain when the vehicle is not being used. To reset any latched protection features of battery supervisor 12, both the vehicle ignition switch (not shown) and switch 105 have to be turned off, momentarily. Capacitor 102 (0.1 μF) is primarily for electrostatic-discharge (ESD) protection. Diodes 103 and 104 block current from flowing back to IGN or BATTERY+. Note! BATTERY+ can be a negative voltage if battery 14 is installed reversed. PTC thermistor switch 106 (PRG18BB330 MB1RB, 33Ω, 85 mA) provides a low voltage drop and short circuit protection for VCC 108. Voltage transient suppressor 107 (SMF16 A) clamps over-voltage transients. Precision reference integrated circuit (IC) 110 (MAX6035B, 5V±0.5%) provides 5V 112 power and a reference voltage to the circuits in battery supervisor 12. Capacitors 109 and 111 (both 1 μF) provide input and output filtering for IC 110, respectively. Resistors 114 (1 MegΩ) and 115 (62.5 kΩ) and power-on-reset (POR) IC 116 (MAX16052) monitor BATTERY+ for excessive voltage dip (+8.5V threshold) and if it occurs, will hold ~RESET low for 4 seconds (which turns winch 24 off), the timing being determined by capacitor 117 (1 μF). The +8.5V threshold also ensures all circuits in battery supervisor 12 have sufficient voltage to function properly. Capacitor 113 (1 μF) filters voltage transients. Resistors 119 (82.5 kΩ) and 120 (10 kΩ) and POR IC 121 (MAX16052) form a POR function (until 5V>+4.65V) via ~RESET to hold the WINCHDRIVE output in FIG. 5 off until 4 seconds after sufficient voltage is reached. Capacitor 122 (1 μF) determines the 4 second delay. The over-current signal, ~CL, from SMART WINCH CONTROLLER 200 in FIG. 4 also initiates a POR function in the event a winch 24 over current condition occurs. Resistor 118 (100 kΩ) is the pull-up resistor for ~RESET.

Figure 4:
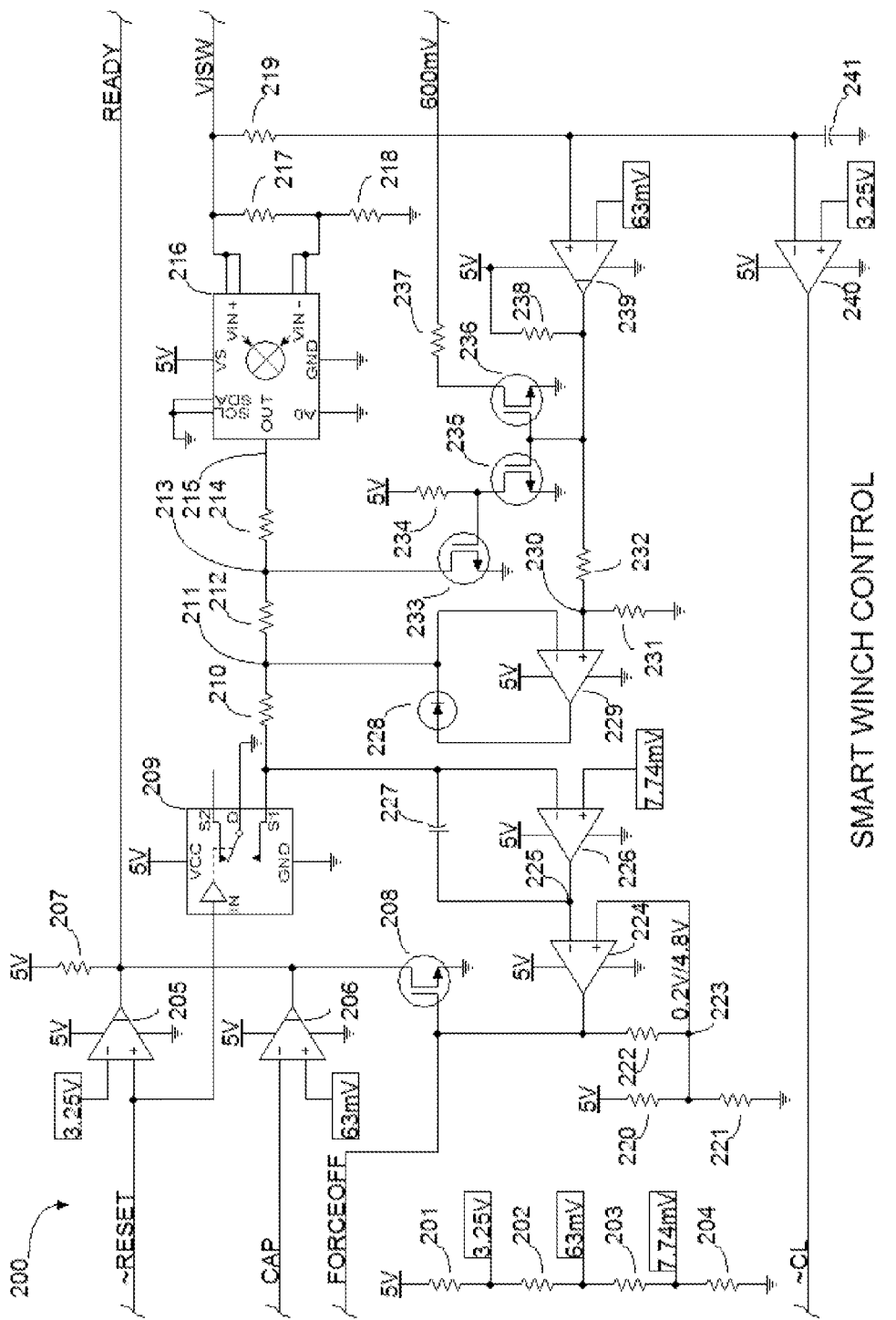
FIG. 4 is a schematic of the smart winch controller circuitry in the block diagram in FIG. 2.

Referring to FIG. 4, SMART WINCH CONTROLLER 200, this circuitry performs all of the on time and off time timing functions for driving winch 24 in FIG. 1 via the "heart" of this circuit, integrator operational amplifier (opamp) IC 226 (LMP2011, chosen for its low offset voltage, 60 μV over temperature, even for the output coming out of saturation from the positive and negative voltage rails). A resistive divider comprised of resistors 201 (182 kΩ), 202 (332 kΩ), 203 (5.76 kΩ) and 204 (806Ω) provide the following reference voltages: 3.25V, 63 mV and 7.74 mV. READY is a "wired-and" function and can be pulled low by either open drain CMOS comparator IC 205 or 206 (both MCP6546s) or N-channel MOSFET 208 (½ of DMN5L06DMK). Resistor 207 (100 kΩ) is the pull-up resistor. IC 205 is active low if ~RESET is <3.25V. IC 206 is active low if CAP is >63 mV ((an indication a pending low state-of-charge (SOC) in battery 14 in FIG. 1 may exist)). MOSFET 208 is active when FORCEOFF is high. Also when ~RESET is low, switch S1 in CMOS analog switch IC 209 (STG719) is on, rapidly driving integrator output 225 to +5V (a POR function). Integrator capacitor 227 (4 each 10 μF, 50V, X7R capacitors in parallel) has a high voltage rating to minimize its voltage coefficient of capacitance. The integrator input resistance during winch 24 on time (integrating from +5V towards 0V) is the combined resistance of resistors 210 (37.4 kΩ), 212 (825Ω) and 214 (825Ω) for 39.05 kΩ. N-channel MOSFET 233 (½ of DMN5L06DMK) is off during winch 24 on time, but CMOS opamp IC 229 (MCP6051) and low leakage diode 228 (⅓ of CMDX6001) will pull node 211 up to the voltage at node 230, if it is not already that high. During winch 24 on time, the integrator 226 is driven by instantaneous power monitor IC 216 (INA223). The programmable feature of IC 216 is not used. Instead, its POR state is used, which is: output mode="supply power", current shunt voltage gain=20V/V and bus voltage gain=0.2 V/V. These settings yield an output "power gain" (in this case, "current squared") of VISW (voltage proportional to winch 24 current, with 2.5V being full scale) times 1/11 of VISW. VISW connects to VIN+ (bus voltage input) of IC 216 and the junction of attenuator resistors 217 (75Ω) and 218 (750Ω) connect 1/11 of VISW (228 mV full scale, which includes 1 mV caused by input bias current) to VIN− (current shunt input) of IC 216. 1/11 of VISW was chosen so as to not saturate the current shunt input amplifier of IC 216 until VISW reaches ~2.74V. With this circuit, the full scale output 215 of IC 216 is 760 mV (2.5V*228 mV*1.333). During winch 24 on time integrator output 225 will integrate from +5V down to 0.2V (0.2V threshold of 0.2V/4.8V switched reference 223) where FORCEOFF from CMOS comparator IC 224 (MCP6541) switches to 5V. At this point, READY goes low and forced winch 24 off time begins. READY is held low until integrator 226 integrates up to the new threshold 223, 4.8V, taking 15 minutes (i.e. forced off time). During this forced off time, winch 24 has no power and VISW=0V. Switched voltage reference 223 (0.2V/4.8V) is provided by resistors 220 (1 MegΩ), 221 (1 MegΩ) and 222 (43.2 k).

Continuing with FIG. 4, the output of open-drain CMOS comparator 239 (MCP6546) is high via pull-up resistor 238

(205 kΩ) when VISW is >63 mV (which determines winch 24 is on). 63 mV was chosen to be less than the voltage at VISW caused by the unloaded current rating of winch 24. One purpose of IC 239 (with output high), resistors 231 (13.7 kΩ), 232 (1 MegΩ) and 238 (205 kΩ), is to establish a reference voltage of 56.6 mV at node 230 for the 2.5 minute timer (which limits the maximum winch 24 on time). The other purpose is to turn on N-channel MOSFETs 235 and 236 (DMN5L06DMK) and turn off N-channel MOSFET 233 (½ of DMN5L06DMK). MOSFET 236 pulls 600 mV down through resistor 237 (10 kΩ) to disable SOC monitoring during winch 24 on time.

Figure 12:
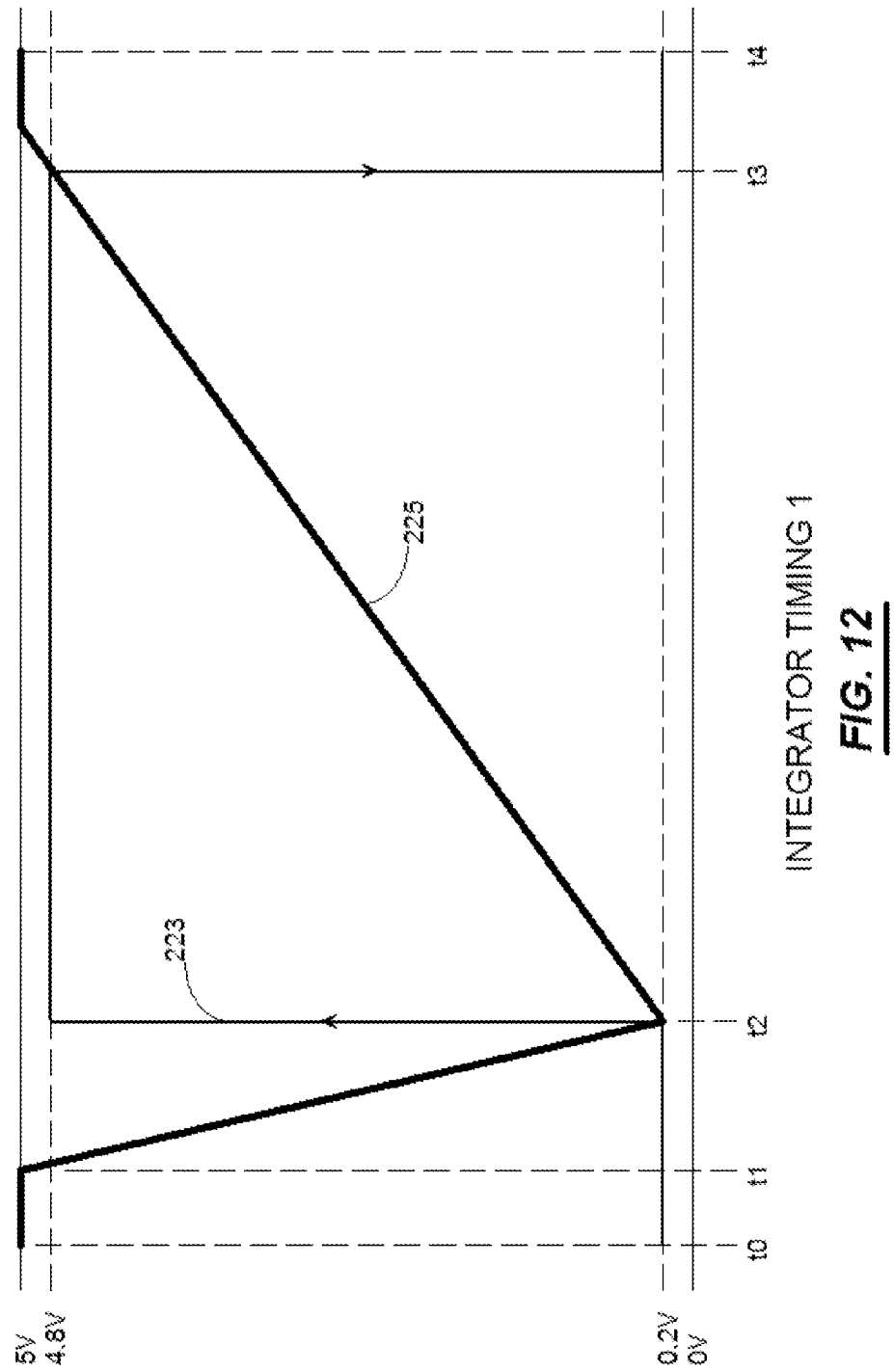
FIG. 12 is a typical voltage and timing diagram of the integrator output and the 0.2V/4.8V node of the smart winch controller in FIG. 4 when the winch is being operated at no load.
Figure 13:
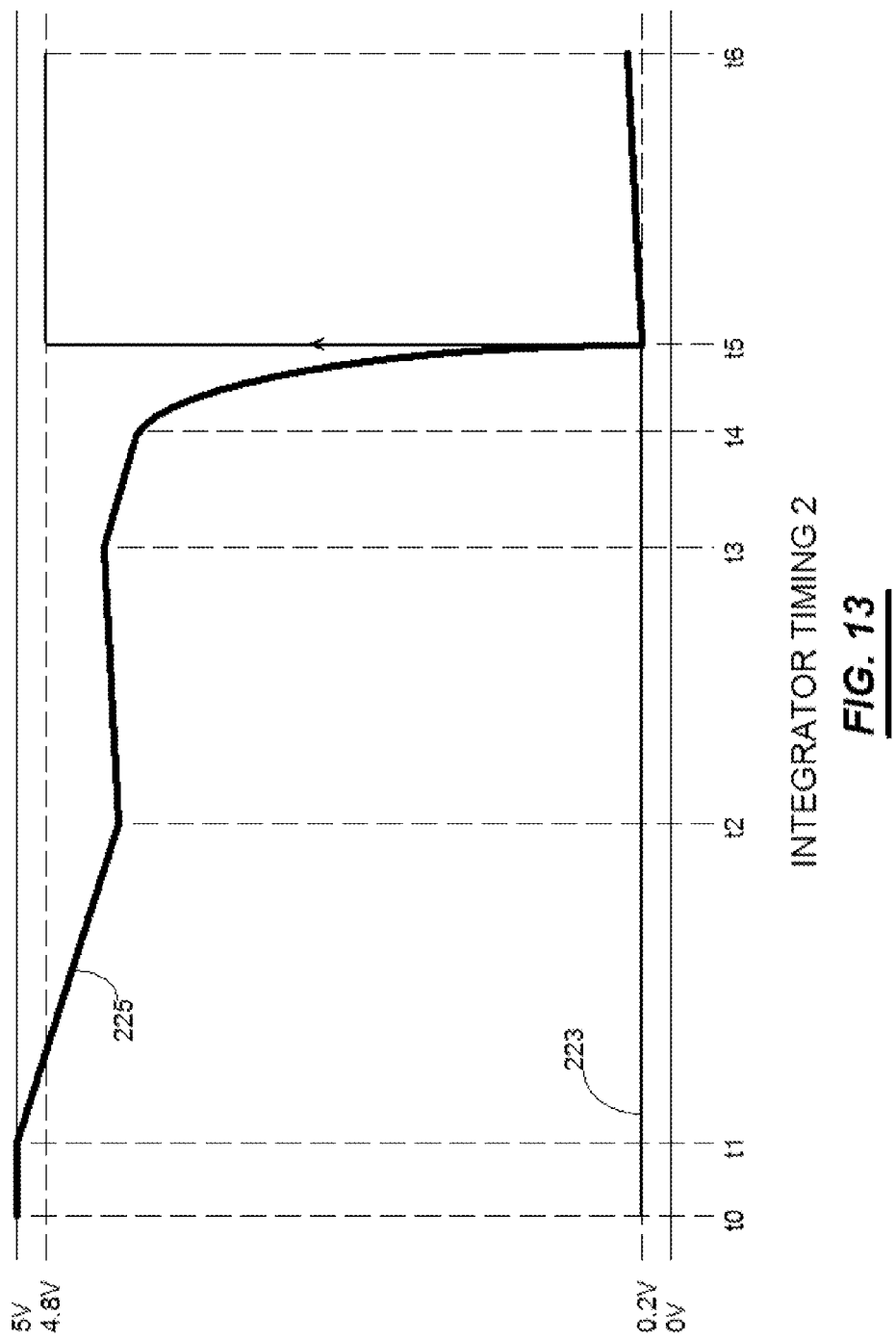
FIG. 13 is a typical voltage and timing diagram of the integrator output and the 0.2V/4.8V node of the smart winch controller in FIG. 4 when the winch is being switched on, off, and then back on again and then the load increases rapidly.

Continuing with FIG. 4, during winch 24 forced off time, comparator 239's output is active low, switching MOSFET 233 on via pull-up resistor 234 (205 kΩ) and enabling SOC monitoring by switching MOSFET 236 off. MOSFET 233 pulls node 213 to very near 0V; therefore, integrator input resistance comprises resistors 210 plus 212 for 38.23 kΩ. MOSFET 233 is necessary because even though IC 216 has a rail-to-rail CMOS output, its output will be a few mV from the supply rails, which is significant when one realizes integrator 229 uses a reference voltage of only 7.74 mV. Integrator 226 timing examples are shown in FIG. 12 and FIG. 13, and will be described later.

Continuing with FIG. 4, during winch 24 on time, CMOS comparator IC 240 (MCP6541) monitors VISW and if its voltage >3.25V (130% of maximum current rating), initiates current limit by taking ~CL low. Resistor 219 (100 k) and capacitor 241 (1 µF) provide a time delay to ignore surge currents of winch 24.

Figure 5:
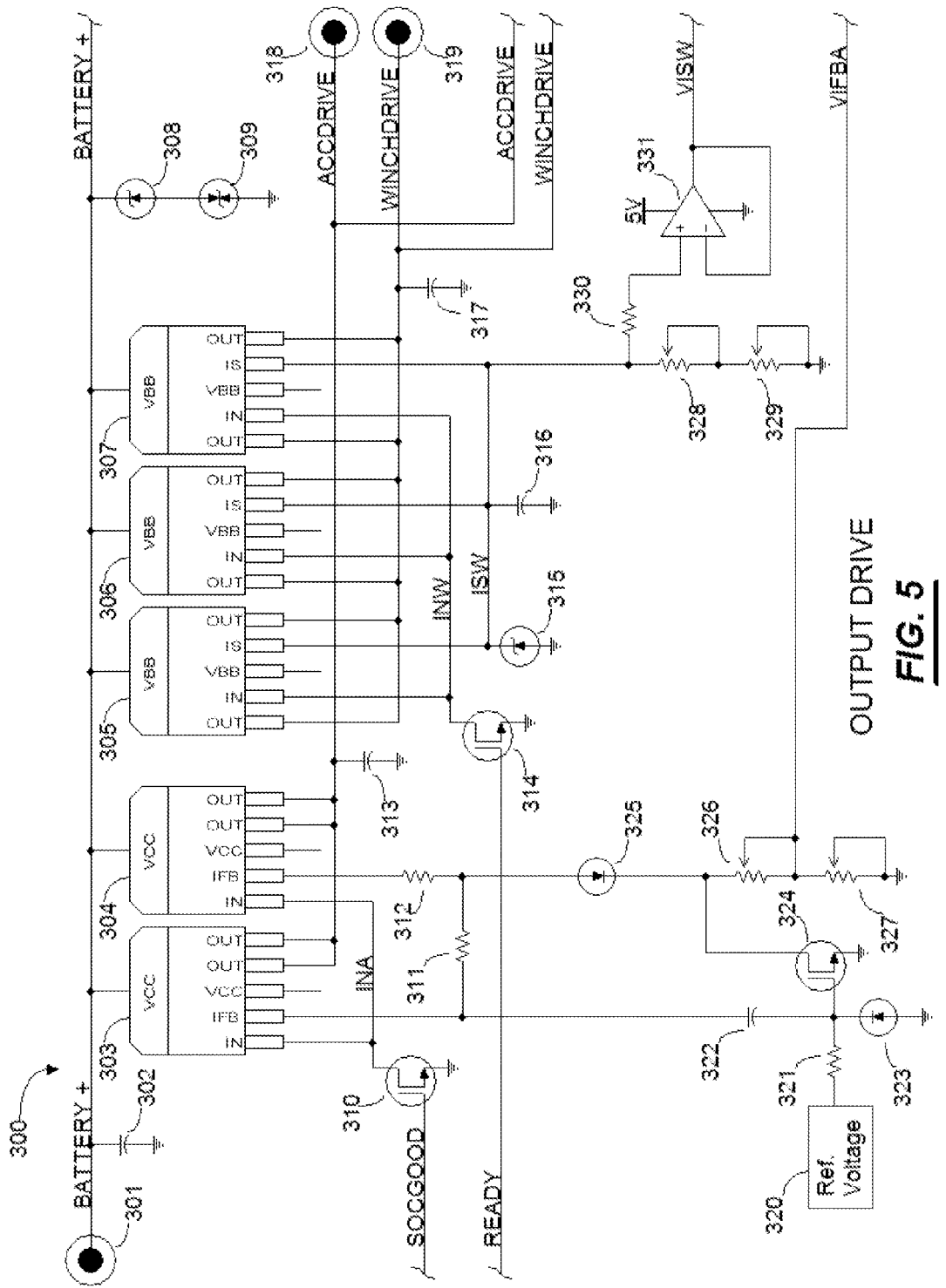
FIG. 5 is a schematic of the output drive circuitry in the block diagram in FIG. 2.

Referring to FIG. 5, OUTPUT DRIVE 300, this circuitry provides the two high current outputs, ACCDRIVE and WINCHDRIVE and their current sensing. Input power BATTERY+ comes Battery 14 in FIG. 1 via threaded terminal 301 (located on battery supervisor 12 in FIG. 1). Capacitor 302 (1 µF in parallel with 0.1 µF) and capacitors 313 and 317 (both 0.1 µF) provide ESD protection and voltage filtering. Transient suppressors 308 (2 each SMDJ8.0 As in parallel) and 309 (2 each 5.0SMDJ14CAs in parallel) limit voltage surges on BATTERY+ in the event there is a loose connection between battery 14 and the vehicle electrical system. The ACCDRIVE circuitry is virtually the same as FIG. 5C in U.S. Pat. No. 7,898,219 and performs the same functions, delivering 30 A to vehicle accessories via ACCDRIVE and threaded terminal 318 (located on battery supervisor 12). N-channel MOSFET 310 (½ of DMN601 DMK) turns intelligent switch ICs 303 and 304 (both IR3313Ss) on when SOCGOOD is high and the body diode in MOSFET 310 provides reverse battery 14 protection when BATTERY+ is negative (i.e. battery 14 is reversed). Resistors 311 (316Ω) and 312 (316Ω) force current sharing of the current from the feedback pins (IFB) of ICs 303 and 304. Diode 325 (½ of IMN10) blocks current from flowing into the IFB pins on ICs 303 and 304. With potentiometer 326 (2 kΩ) set to minimum resistance, potentiometer 327 (1 kΩ) is adjusted to make VIFBA equal to 1.5V when ACCDRIVE is delivering 30 A. Next, potentiometer 326 is adjusted for a current limit latch to occur in ICs 303 and 304 at a load current of 33 A. Ref. Voltage 320 (200 mV) and resistor 321 (200 kΩ) bias the gate of N-channel MOSFET 324 (½ of DMN5L06DMK) to make its gate threshold voltage 0.29 to 0.8V. Then, sudden output current surges on ACCDRIVE (even when the output current is ~25 A) cause a voltage transient on IFB on IC 303 that is coupled through capacitor 322 (1 µF) to turn MOSFET 324 on to prevent over-current latching of ICs 303 and 304 for a time determined by capacitor 322 and resistor 321. If the surge current on ACCDRIVE exceeds ~200 A, internal latches latch ICs 303 and 304 off. Diode 323 (½ of IMN10) discharges capacitor 322 for the next surge event.

Figure 10:
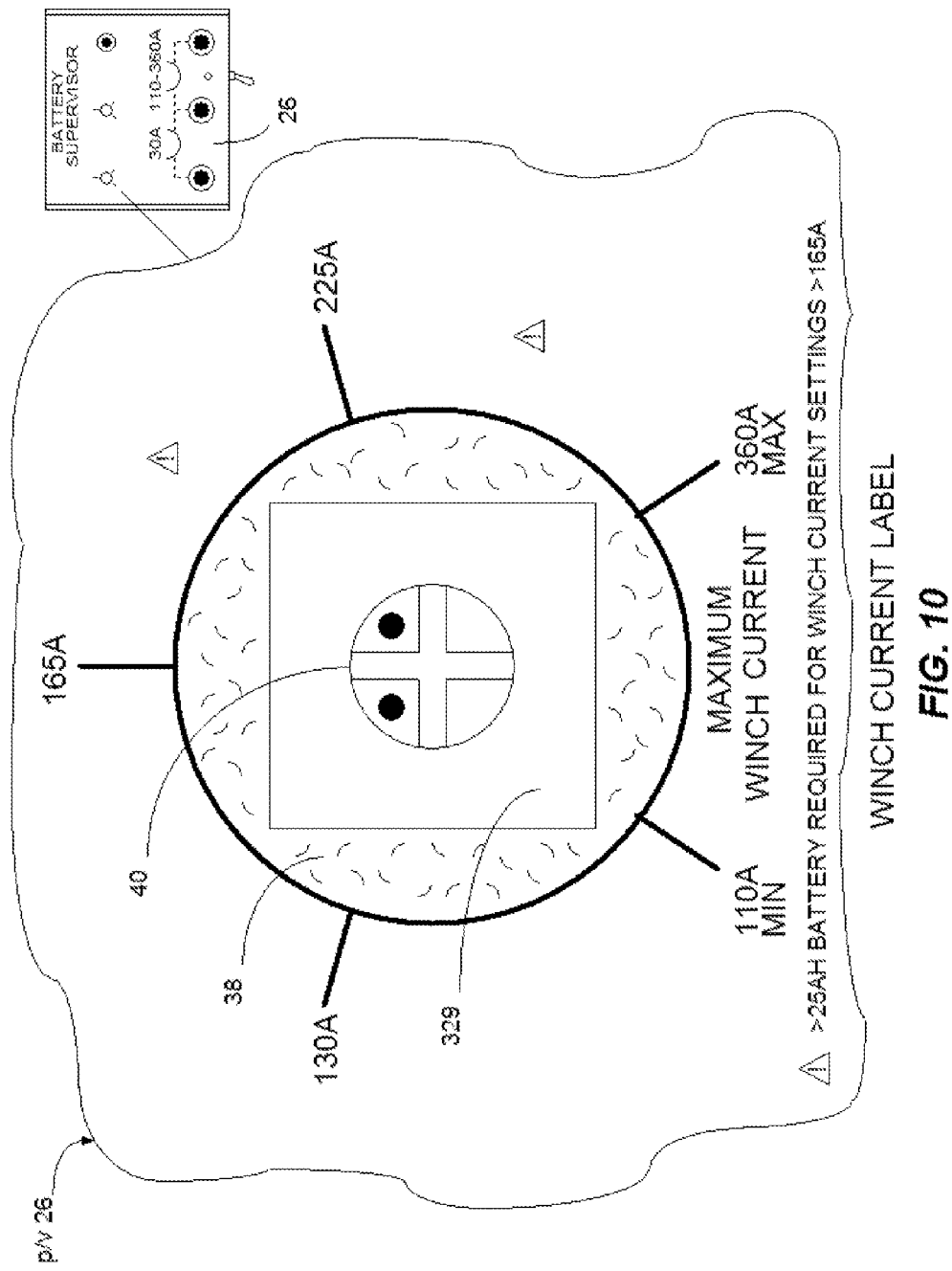
FIG. 10 is a partial view drawing of the battery supervisor label in FIG. 1 showing typical marking for the maximum winch current adjustment.

Continuing with FIG. 5, the WINCHDRIVE circuitry uses intelligent power switch ICs 305, 306 and 307 (all BTS555s) that are rated to deliver a continuous combined current of 384 A to the load through output WINCHDRIVE and threaded terminal 319. Internal short circuit latches typically trip at 1200 A at 25° C. (although very difficult to achieve), but the over current feature in smart winch controller 200 in FIG. 1 current limits at a much lower level. ICs 305, 306 and 307 are turned on by N-channel MOSFET 314 (½ of DMN601 DMK) when READY is high. The body diode in MOSFET 314 provides reverse current protection when battery 14 is reversed. The current sense output ISW of ICs 305, 306 and 307 is proportional (typically 30,000 to 1) to the WINCHDRIVE output current and is sensed through potentiometers 328 and 329 (both 500Ω). Voltage follower CMOS opamp IC 331 (MCP6051) buffers the sensed ISW voltage. Resister 330 (10 kΩ) limits the current into opamp 331 when the ISW voltage exceeds the supply rails. With potentiometer 329 set to minimum resistance and the WINCHDRIVE output current set to 360 A, potentiometer 328 is set for VISW to be 2.5V. Potentiometer 329 is a one-time adjustment the vehicle owner makes to correspond to the maximum current rating of winch 24 in FIG. 1 installed on the vehicle. Zener diode 315 (SMAZ6V8) provides voltage clamping for positive and negative voltages on INW and Capacitor 316 (1 µF) provides filtering for INW. Refer to FIG. 10 to see how markings on label 26 in FIG. 1 might appear for adjustment of potentiometer 328. FIG. 10 will be described in more detail, later.

Figure 6:
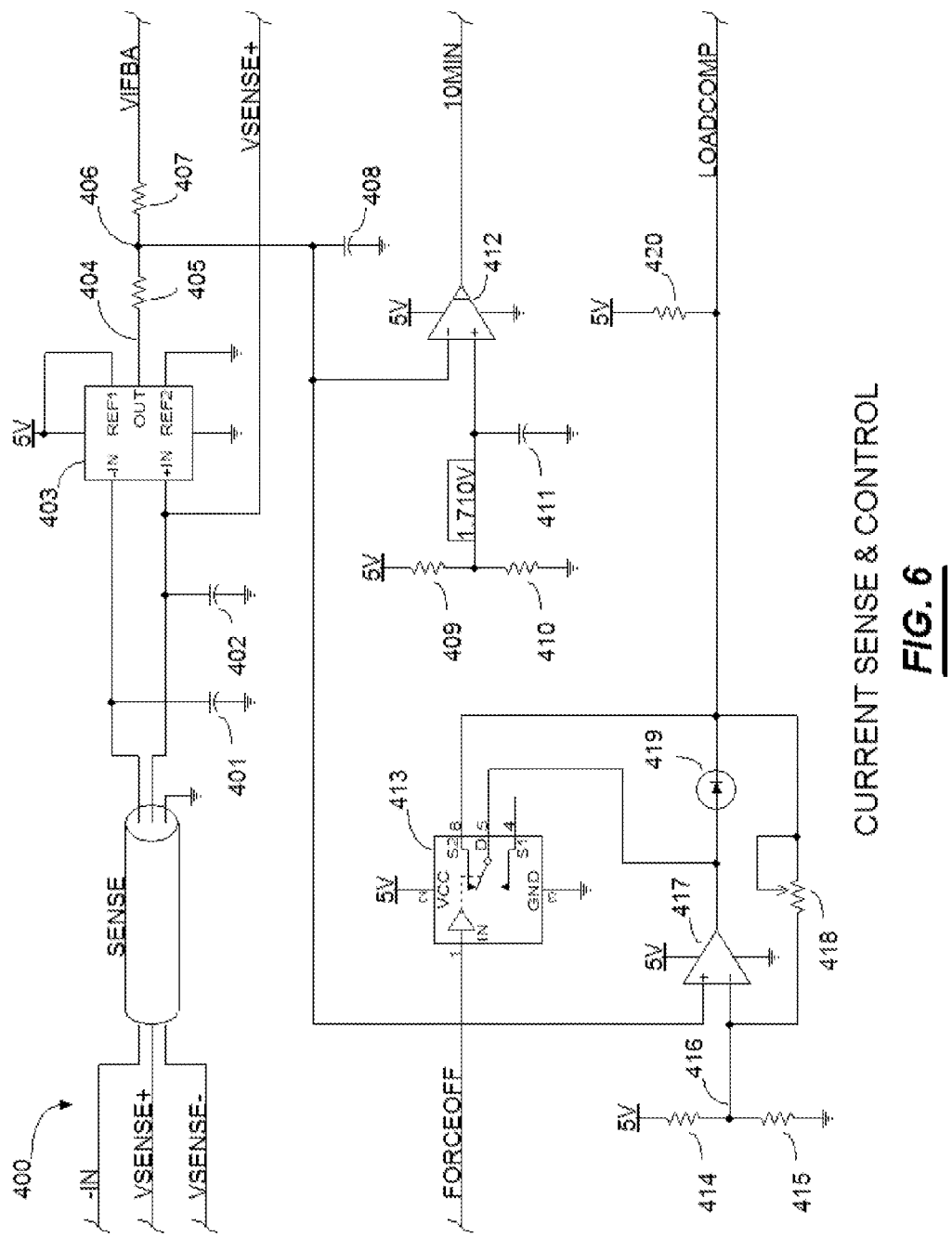
FIG. 6 is a schematic of the current sense and control circuitry in the block diagram in FIG. 2.
Figure 7:
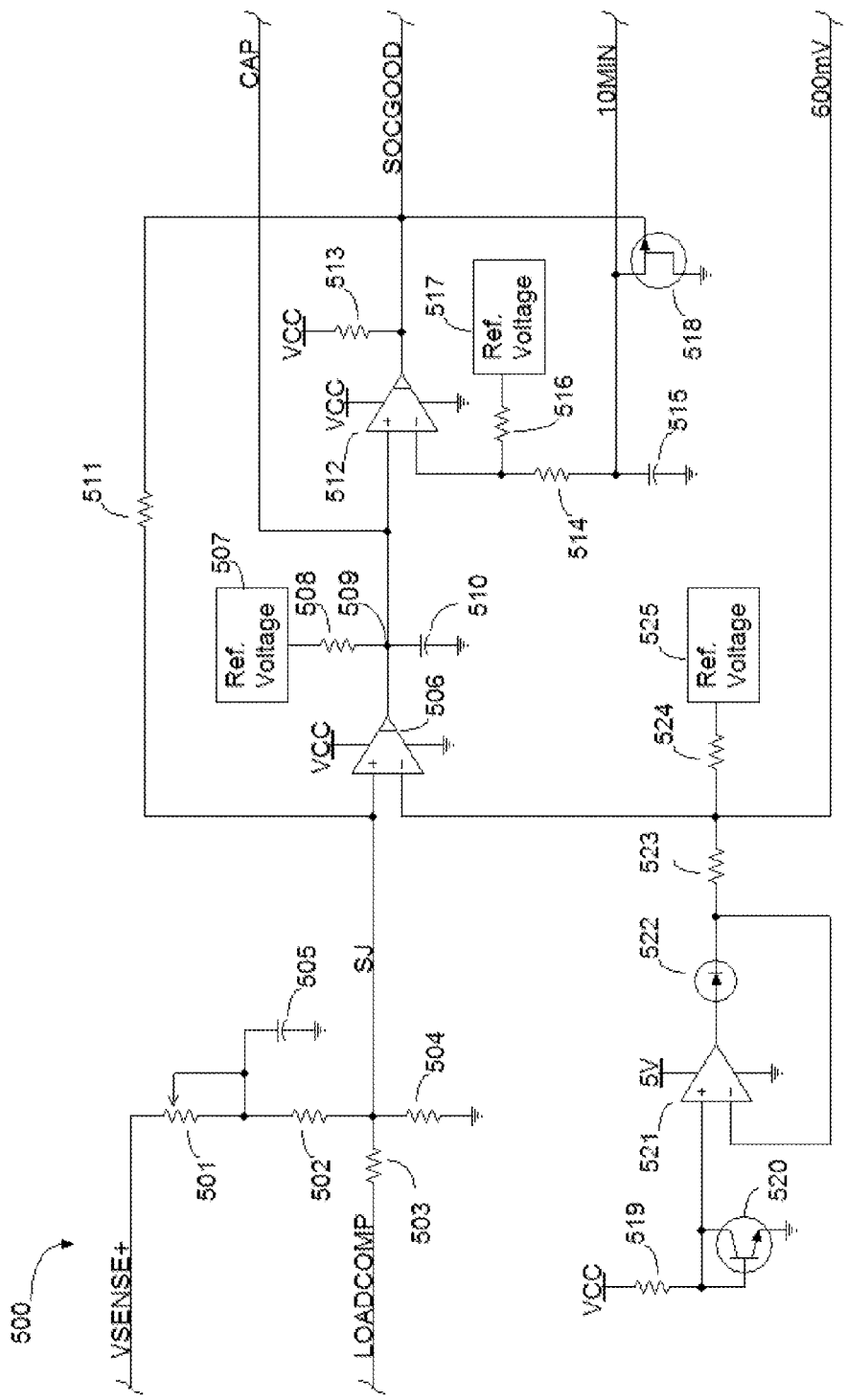
FIG. 7 is a schematic of the battery voltage monitor and dual timer circuitry in the block diagram in FIG. 2.

Referring to FIG. 6, CURRENT SENSE & CONTROL 400, this circuitry performs the following functions: monitors the vehicle engine current (charging or discharging), combines the engine current with the accessory current at node 406 (i.e. voltages proportional to their currents), provides compensation (i.e. load compensation) for the internal resistance (Rint) of battery 14 in FIG. 1 for SOC monitoring of battery 14 for a combined current that is discharging battery 14 during off time of winch 24 of FIG. 1, provides load compensation for SOC monitoring of battery 14 for a combined current that is charging or discharging battery 14 during forced off time of winch 24 and controls the dual timer in FIG. 7. Not providing load compensation for a combined charging current of battery 14 during off time of winch 24 facilitates a fast recovery to a good SOC following a low SOC event.

Figure 11:
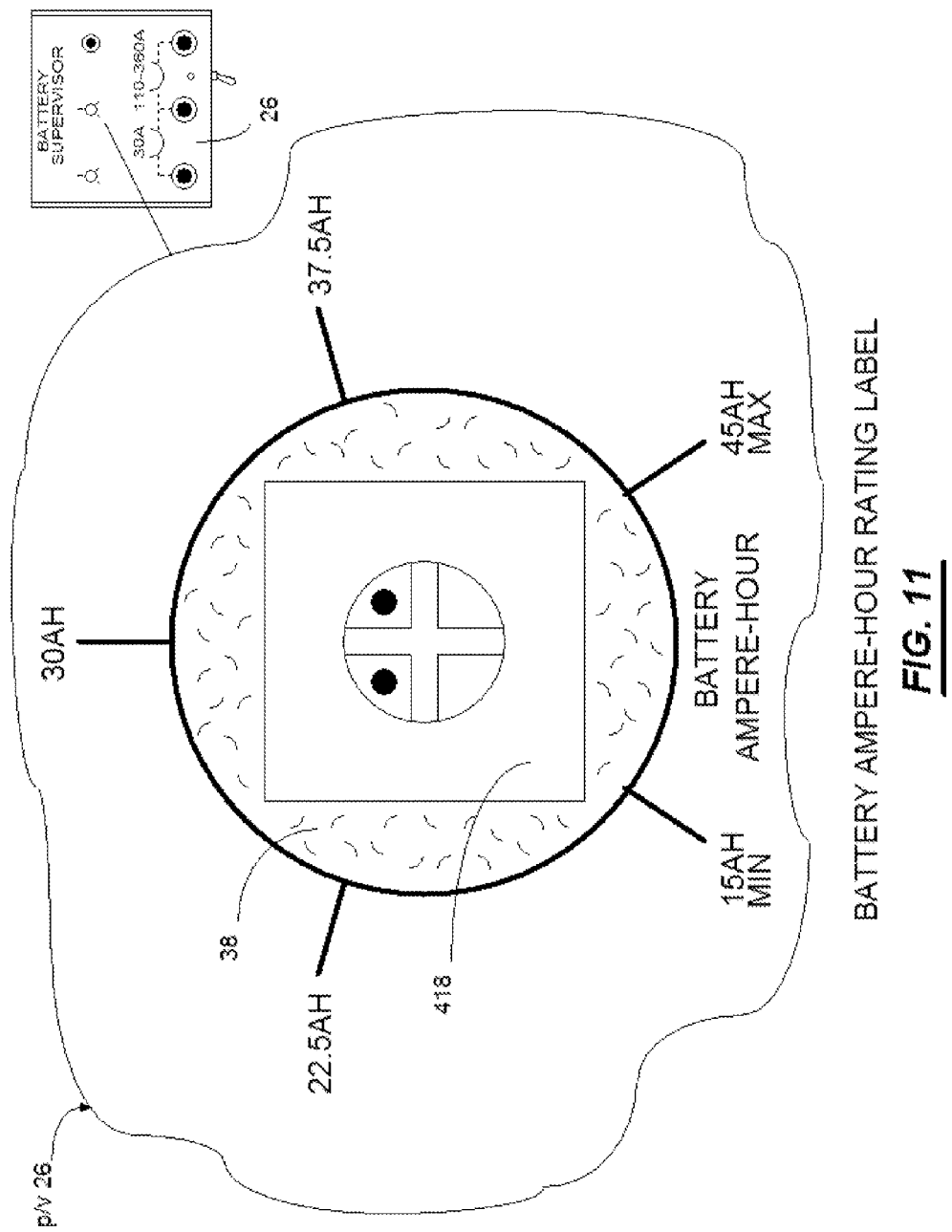
FIG. 11 is a partial view drawing of the battery supervisor label in FIG. 1 showing typical marking for the battery ampere-hour (AH) adjustment.

Continuing with FIG. 6, the "hard-wired" SENSE cable (jacketed, 3-wire, 16 awg, cable recommended for ruggedness) connects –IN, VSENSE+ and VSENSE– from FIG. 1 to circuitry 400. Bi-directional current monitor IC 403 (INA286) monitors –IN and VSENSE+ from current sense resistor 18 in FIG. 1 and converts the full scale current, ±60 A, to a voltage (2.5V±1.5V) at node 404. VSENSE– is the ground connection for all the circuits in battery supervisor 12 in FIG. 1. Capacitors 401 and 402 (both 0.1 µF) provide ESD protection. VIFBA (0 to 1.5V for 0 to 30 A ACCDRIVE current) is connected through resistor 407 (200 kΩ) to resistor 405 (100 kΩ) to combine node 404 voltage (engine current) with VIFBA (accessory current) to yield the summed voltage at node 406. The nominal voltage at node 406 for a summed current of 0 A is 1.667V. When battery 14 is being discharged, the voltage at node 406 ranges between 1.667V (0 A load) and 3.17V (90 A load). Open drain CMOS comparator IC 412 (MCP6546) is active low when the voltage at node 406 is <1.710V. The reference, 1.710V, (representing a 2.5 A battery 14 load) is provided by resistors 409 (200 kΩ) and 410 (104 kΩ) and filtered by capacitor 411 (0.1 µF). Capacitor 408 (10 µF) filters ripple voltage caused by the vehicle alternator and the loads. Switch S2 in analog switch IC 413 (STG719) is on when FORCEOFF is high and diode 419 (⅓ of CMDX6001) is shorted. The variable gain, load compensation amplifier circuitry consisting of CMOS opamp IC 417 (MCP6051), voltage divider resistors 414 (252 kΩ) and 415 (126 kΩ), potentiometer 418 (100 kΩ) and diode 419 provides LOAD-COMP. Potentiometer 418 provides a variable gain (1.0 for a 45 AH battery 14 and 2.19 for a 15 AH battery 14) for LOADCOMP and needs to be set based on the battery 14 installed on the vehicle. When FORCEOFF is low, switch S2 in IC 413 is open and diode 419 is no longer shorted. And, if node 406 is 1.667V (0 A of current), node 416 and LOAD-COMP will also be at 1.667V. With FORCEOFF low, resistor 420 (1.04MegΩ) provides the pull-up to hold LOADCOMP at 1.667V when battery 14 is being charged. This compensation was chosen for the Odyssey family of absorbed-glass-mat (AGM) "dry-cell" batteries. At first glance, it seems as though the load compensation should have a gain range of 1.0 to 3.0 for a battery 14 range of 15 to 45 AH. Upon closer examination, one realizes that if you have two identical batteries in parallel operating at a given load current, the paralleled Rint of the batteries is not ½ the Rint of one of the batteries operating at the given load current because each of the two batteries will be operating at ½ the given load current and Rint increases as current decreases in a battery. Typical Rint values for the Odyssey PC925 battery that has been discharged to an SOC of approximately 42% (approximate trip point for a low SOC) are: 25.6 mΩ@3.12 A, 24 mΩ@6.25 A, 22.4 mΩ@12.5 A, 20 mΩ@25 A, 16.2 mΩ@50 A, 14.3 mΩ@85 A and 7.5 mΩ@355 A. Between 3 A and 50 A (approximate range of current the engine and accessories might draw), Rint varies from 25.6 mΩ to 16.2 mΩ, respectively, and a nominal value is approximately 21 mΩ. For a battery of similar construction, a 30 AH battery 14 (mid-range for battery supervisor 12 requirement), Rint would be approximately 20 mΩ. So Rint=20 mΩ is chosen for load compensation, LOADCOMP. As battery 14 ages, Rint will increase, Rint compensation will be insufficient and battery supervisor 12 will shut down at a higher SOC. This is good because it will ensure the engine can still be started, but is a warning that battery 14 may need to be replaced. Refer to FIG. 11 to see how markings on label 26 in FIG. 1 might appear for adjustment of potentiometer 418. FIG. 11 will be described in more detail, later.

Referring to FIG. 7, VOLTAGE MONITOR & DUAL TIMER 500, this circuit is taken from U.S. Pat. No. 7,898,219 with some improvements. It monitors the voltage of battery 14 in FIG. 1 via VSENSE+ to determine the SOC of battery 14 along with battery 14 load compensation from LOADCOMP through resistor 503 (332 kΩ). Temperature compensation occurs below approximately 70° F. A dual timer (1 minute or 10 minute) prevents nuisance shutdowns (SOCGOOD going low) for engine starting, for battery 14 loads >2.5 A (1 minute) and for battery 14 loads <2.5 A (10 minutes). VSENSE+ voltage is divided down by potentiometer 501 (200 kΩ, typically set at 101 kΩ), resistor 502 (150 kΩ) and resistor 504 (12.1 kΩ). Hysteresis (−270 mV at VSENSE+) is provided by resistor 511 (20 MegΩ) and open drain CMOS comparator IC 506 (MAX6460). The hysteresis internal to IC 506 is typically 6 mV and is asymmetrical about the reference voltage, 600 mV >70° F., on its non-inverting input. i.e. the negative going threshold is 600 mV and the positive going threshold is 606 mV. Capacitor 505 (0.1 μF) filters VSENSE+ voltage. Ambient temperature compensation is provided by "diode-connected" NPN transistor 520 (BC847CW) for temperatures below approximately 70° F., with Ref. Voltage 525 equal to 600 mV above approximately 70° F. and a higher voltage below approximately 70° F. Ref. Voltage 525 has a Thevenin equivalent series resistance 524 (8.87 kΩ). An "ideal diode" circuit consisting of CMOS opamp IC 521 (MCP6051) and diode 522 (⅓ of CMDX6001) prevents compensation above approximately 70° F. This allows a more accurate measurement of the SOC of battery 14 for temperatures >70° F. Transistor 520 is biased at approximately 200 μA by resistor 519 (56.2 kΩ). The VBE voltage of transistor 520 has a negative temperature coefficient of approximately −2.2 mV/° C. (approximately −1.22 mV/° F.) and a typical VBE voltage of 740 mV at −40° F. Therefore, resistor 523 (56.2 kΩ) increases reference voltage, 600 mV, to approximately 619 mV at −40° F. (which represents an SOC of approximately 75% and a voltage of approximately 12.5V for battery 14). This voltage compensation was chosen for battery 14 because as temperatures get colder, battery 14 energy decreases and engines are harder to start. The threshold voltage for VSENSE+ is set at 12.1V at no load on battery 14 above 70° F. (which is approximately 42% SOC of battery 14) and at approximately 12.37V for the threshold voltage (SOC-GOOD going high again). Ref. Voltage 507 is 2.25V. Timing resistor 508 (3.48 MegΩ) and capacitor 510 (4 each 47 μF, 10V, X7R in parallel) provide RC time constant curve at node 509 that open drain comparator IC 512 (MAX6460) compares to a 211 mV threshold when 10MIN is low (1 minute timer selected) and a 1.3V threshold when 10MIN is high (10 minute timer selected). Ref. Voltage 517 (1.3V), resistor 516 (57.8 kΩ, Thevenin equivalent resistance) and resistor 514 (11 kΩ) combine with 10MIN to switch the dual timer. Capacitor 515 (0.1 μF) is a filter capacitor. Resistor 513 (33.2 kΩ) provides pull-up for SOCGOOD. If a low SOC event occurs (SOCGOOD goes low), P-channel FET 518 (MMBJ175) latches the dual timer in the 1 minute state. Therefore, the timer stays latched in the 1 minute state until the voltage on battery 14 is charged up approximately 270 mV (IC 506 hysteresis).

Figure 8:
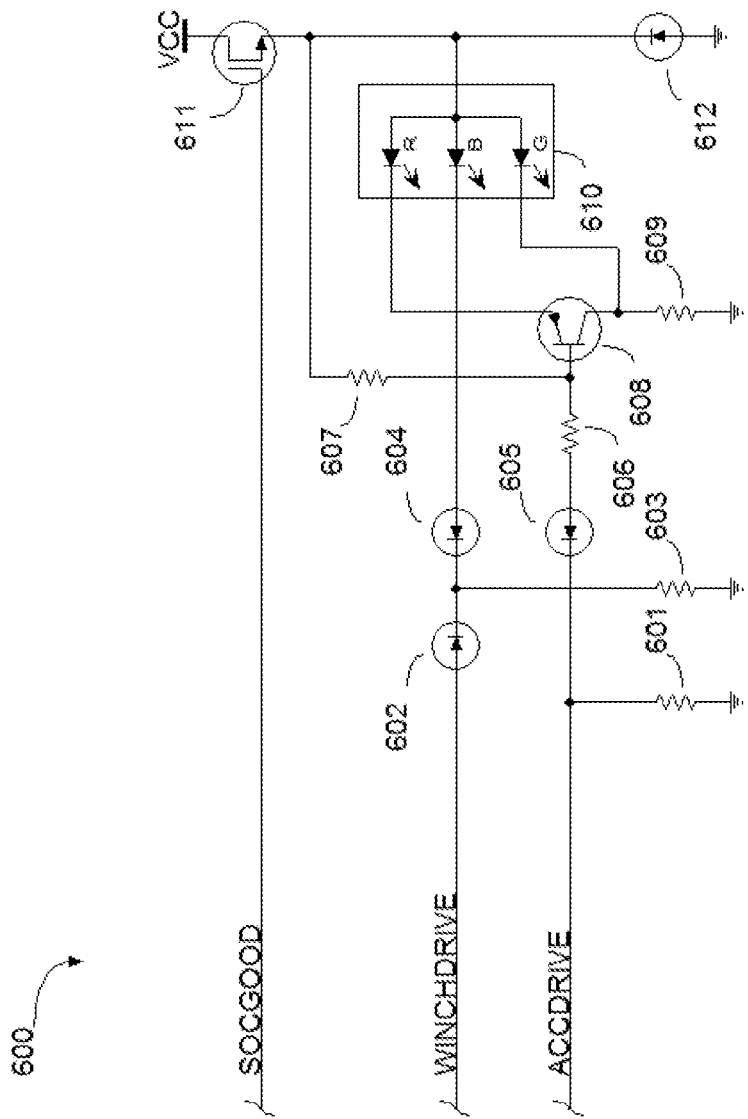
FIG. 8 is a schematic of the status circuitry in the block diagram in FIG. 2.

Referring to FIG. 8, STATUS 600, and FIG. 14, LED STATUS VS. OUTPUT DRIVES, red-green-blue (RGB) LED 610 (LATBT66C) displays (via a light pipe) the status of the various states of the output drives in FIG. 5. The table in FIG. 14 shows the color of LED 610 for various states. For example, status 1 is when battery 14 in FIG. 1 is reversed and LED 610 color is RED. This is not a normal operating mode, but warns the operator of a fault. The red LED in LED 610 is turned on when current flows through diode 612 (⅓ of IMN10), the red LED, the emitter-base junction of PNP transistor 608 (BC857CW), resistor 606 (2 kΩ) and diode 605 (⅓ of IMN10) into the accessory output ACCDRIVE. ACCDRIVE voltage will be negative and resistor 606 will limit LED 610 current. Under normal operating conditions, when battery 14 polarity is corrected, status 2 is when SOC-GOOD is high, WINCHDRIVE and ACCDRIVE will be on and approximately equal to battery 14 voltage, N-channel MOSFET 611 (⅓ of DMN5L06DMK) will be on and current will be flowing from VCC through MOSFET 611, through the green LED in LED 610 and through resistor 609 (4.02 k) to ground. Pull-up resistor 607 (221 kΩ) biases transistor 608 off. Diode 605 prevents voltage transients from damaging transistor 608. When WINCHDRIVE is low (during forced winch 24 off time or when a protection feature is activating a 4 second POR), the blue LED in LED 610 will also be on, status 3, causing the color to be aqua. Current will also be flowing through the blue LED, diode 604 (⅓ of IMN10) and resistor 603 (3.01 kΩ) to ground. Diode 602 (⅓ of IMN10) blocks current from flowing into WINCHDRIVE. If battery 14 has insufficient SOC (SOCGOOD is low), status 4, WINCHDRIVE AND ACCDRIVE will be low, LED 610 will be off and there will be no color emitted. In the event an over-temperature or short circuit event has occurred on ACCDRIVE in ICs 303 and 304 in FIG. 5 causing its output to be latched low, and WINCHDRIVE is functioning normally and is low, status 5, the red and blue LEDs will be on causing the color to be purple. Status 6 is the same as status 5 except WINCHDRIVE is high. Then, only the red LED will be on by resistor 601 (33.2 k). Resistor 601 holds the voltage caused by leakage current from ACCDRIVE low enough to bias transistor 608 on through diode 605 and resistor 606. Red LED current flows through saturated transistor 608 through resistor 609 to ground. Since the forward voltage drop on the red LED (approximately 2.0V) is much lower than the forward voltage drop on the green LED (approximately 3.5V), the green LED will be off. Status 7 is the same as status 3, except WINCHDRIVE is latched off due to an over-temperature or short-circuit protection feature being activated in ICs 305, 306 and 307 in FIG. 5.

Figure 9:
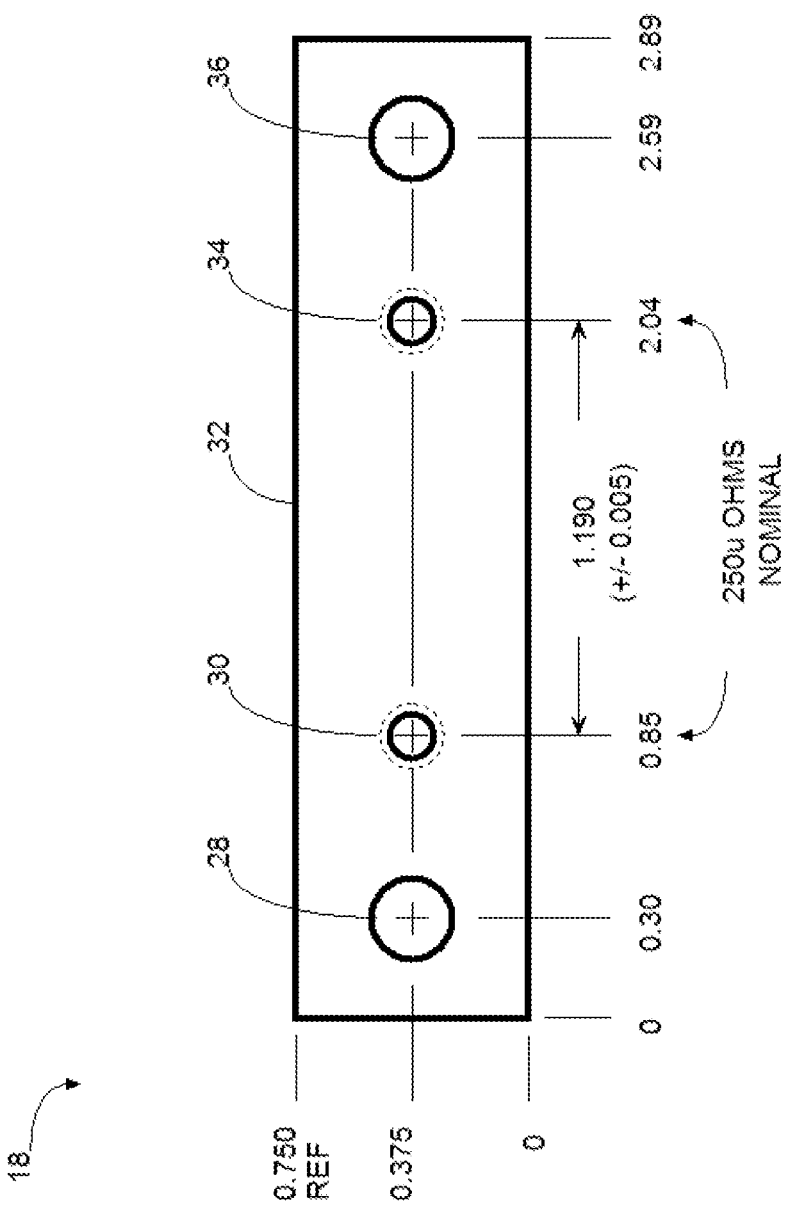
FIG. 9 is a mechanical drawing of the 250 micro-ohm ($\mu\Omega$) current sense resistor in FIG. 1.

Referring to FIG. 9, SENSE RESISTOR, 25µ OHMS, this mechanical drawing is a two dimensional drawing showing how the 4-terminal sense resistor 18 in FIG. 1 is manufactured. Resistor 18 is a low cost, practical solution for measuring the current of battery 14 in FIG. 1. The bar stock 32 is 0.188×0.750 inches of 304/304L stainless steel. This bar stock was chosen for its low cost, usable resistivity, low temperature coefficient of resistivity, power handling capability and mechanical ruggedness. Power connections are made via holes 28 and 36 (0.25 inches) for 6 mm screw mounting. Threaded holes 30 and 34 (6-32) are sense voltage taps for resistor 18. The calculated spacing for a 250µΩ resistor of bar stock 32 is 1.124 inches, but, in practice, the stainless steel screw and lug connections and missing material in holes 30 and 34 add a resistance of being approximately 10µΩ; therefore, a dimension of 1.190 inches yields 250µΩ.

Referring to FIG. 10, WINCH CURRENT LABEL, this is a partial view (p/v) of label 26 on battery supervisor 12 in FIG. 1 showing a typical marking for the one-time adjustment that needs to be made corresponding to the maximum current rating of winch 24 in FIG. 1 installed on the vehicle. Sealed potentiometer 329 in FIG. 5 (500Ω) can be set from 0Ω (360 A) to 500Ω (110 A) to set the current. Potentiometer 329 is exposed for access above potting material 38 (urethane, epoxy or a combination used for moisture protection). Adjustment device 40 is typical for a surface mount potentiometer with the 2 dots indicating that the wiper of the potentiometer is pointing to 165 A. Note the warning that indicates a larger battery 14 in FIG. 1 is required for maximum winch 24 currents above 165 A.

Referring to FIG. 11, BATTERY AMPERE-HOUR RATING LABEL, this is a partial view (p/v) of label 26 on battery supervisor 12 in FIG. 1 showing a typical marking for the one-time adjustment that needs to be made corresponding to the ampere-hour (AH) rating of battery 14 in FIG. 1 installed on the vehicle. Sealed potentiometer 423 in FIG. 6 (100 kΩ) can be set from 100 kΩ (15 AH) to 0Ω (45 AH) to set the AH rating. Potting material 38 surrounds potentiometer 423.

Referring to FIG. 12, INTEGRATOR TIMING 1, and FIG. 4, SMART WINCH CONTROLLER 200, this diagram shows the timing for integrator output 225 and switched reference 223 (0.2V/4.8V) for winch 24 in FIG. 1, drawing a no load rated current until a forced off time occurs. Integrator output 225 is linear as it decreases from 5V to 0.2V because it has a constant DC voltage input provided by the 2.5-minute timer reference voltage at node 230. Time begins at t0, where winch 24 has been off, integrator output 225 is at 5V and reference 223 is at 0.2V. Winch 24 is turned on at t1 and is kept on until t2 (2.5 minutes) where reference 223 switches to 4.8V, winch 24 is forced off and integrator output 225 begins its fixed off time ramp. This ramp is always linear because integrator 226 always has a constant 7.74 mV reference during forced off time. The time from t2 to t3 is 15 minutes. At t3, reference 223 switches back to 0.2V and winch 24 could be turned back on (assuming the operator released switch 20 in FIG. 1 during the forced off time). In this case, winch 24 was not turned back on and integrator output 225 continues to be 5V where it awaits the next time winch 24 is used.

Referring to FIG. 13, INTEGRATOR TIMING 2, and FIG. 4, SMART WINCH CONTROLLER 200, this diagram shows the timing for integrator output 225 and switched reference 223 (0.2V/4.8V) for winch 24 in FIG. 1 being switched on, then off, then on again and after a short time the load on winch 24 increases initiating a forced off time at t5. From t0 to t1, integrator output 225 is at 5V and reference 223 at 0.2V waiting for winch 24 to be turned on. This waveform for integrator output 225 might represent an operator attaching the wire rope of winch 24 to a tree stump, taking up the slack in two steps (t1 to t2 and t3 to t4) and then seeing the load increase (and consequently winch 24 current increase) as the wire rope tightens (t4 to t5) until a forced off time is reached at t5 where reference 223 switches to 4.8V, integrator output 225 begins its forced off time (t5 to t6). The 15 minute timer is operating from t2 to t3, but this is not a forced off time and did not start at 0.2V.

What I claim as my invention is:

1. A control system for an electric winch system of a vehicle, the control system comprising:
   a current sense resistor for measuring an engine current between a battery and an engine of said vehicle and producing a first current sense voltage proportional to said engine current; and
   a battery supervisor having a battery status circuit and a smart winch controller, the battery supervisor comprising:
   a first input via a power cable for receiving current from said battery;
   a second input via a sense cable for receiving said first current sense voltage;
   a third input via said sense cable for receiving a battery voltage of said battery;
   a fourth input from an ignition switch of said vehicle for providing bias power to said battery supervisor when said ignition switch is on and a toggle switch with external access on said battery supervisor is off, and when both said ignition switch and said toggle switch are off said battery supervisor is in its off state;
   the toggle switch is an alternate method of supplying said bias power to said battery supervisor when said toggle switch is switched on, but use of said toggle switch is generally reserved for operating a said vehicle accessory such as a radio or for an emergency use of said winch;
   an accessory drive output for delivering accessory current to accessory loads of said vehicle;
   a winch drive output for delivering winch current to a winch mounted on said vehicle;
   a first current sense circuit for measuring said accessory current and producing a second current sense voltage proportional to said accessory current, wherein said second current sense voltage is to be summed with said first current sense voltage to provide a net current sense voltage representing said net battery current, all occurring when said winch is not being operated;
   a second current sense circuit for measuring said winch current when said winch is being operated and producing a third current sense voltage proportional to said winch current, for use by said smart winch controller, a first latching circuit breaker circuit integral to said battery supervisor to provide over-current protection for said accessory loads and said accessory load wiring of said vehicle and if said first latching circuit breaker circuit is tripped, it can be reset by placing said battery supervisor in its said off state;

a second latching circuit breaker circuit integral to said battery supervisor to provide short-circuit protection for said winch drive output and if said second latching circuit breaker circuit is tripped, it can be reset by placing said battery supervisor in its said off state; and a status indicator for indicating, with different colors or no color, a status of various states of said accessory drive output and said winch drive output of said battery supervisor, since both said accessory drive output and said winch drive output can be on or off at different times, the battery status circuit for determining if sufficient energy remains in said battery to allow said accessory drive output and said winch drive output to be on, the battery status circuit comprising:

a voltage measurement circuit for measuring said battery voltage of said battery, wherein said battery voltage is a measure of a state-of-charge of said battery;

a load compensation circuit for compensating said voltage measurement circuit for a voltage drop that occurs across an internal resistance of said battery caused by a net battery current, said engine current added to said accessory current, thus producing a load compensated battery voltage, wherein said internal resistance varies with an ampere-hour rating of said battery;

a first potentiometer with external access on said battery supervisor for setting said ampere-hour rating of said battery installed on said vehicle;

a temperature compensation circuit for linearly increasing a threshold level of said load compensated battery voltage to require a minimum value of said state-of-charge of said battery to be typically 42% at approximately 70° F. up to approximately 75% at −40° F., requiring a higher said state-of-charge of said battery for colder temperatures when it would be more difficult to start said engine;

a state-of-charge comparator for producing a signal, after a delay, for turning said accessory drive output and said winch drive output on when said state-of-charge level is above said threshold level and off when below said threshold level; and a dual timer circuit for creating said delay of 1 minute for said net battery current of said battery >2.5 A and said delay of 10 minutes for said net battery current <2.5 A, to allow said battery voltage time to settle because of a chemical reaction going on inside said battery following various levels of said net battery current, the smart winch controller comprising:

a short term energy measurement circuit for establishing an energy limit being delivered to said winch;

a 15 minute timer for creating a forced off time of 15 minutes following a winch on time of said winch that reaches said energy limit;

a 2.5 minute timer for controlling a maximum said winch on time of said winch for any continuous level of said winch current being delivered to said winch, regardless of whether or not said energy limit has been reached;

a hiccup mode, excessive voltage dip circuit for measuring a voltage of said battery during said winch operation and turning said winch drive output off for approximately 4 seconds when said voltage drops below approximately 8.2V, thus protecting said electric winch system from operating with insufficient voltage;

a hiccup mode circuit breaker circuit integral to said battery supervisor for providing over-current protection for said electric winch system and said winch drive output;

a second potentiometer with external access on said battery supervisor for setting a maximum current rating of said winch mounted on said vehicle;

a third current sense circuit determines when said winch is being operated and disables said battery status circuit, said third current sense circuit disables said battery status circuit when said winch current of said winch is greater than approximately 2.8 A of said maximum current rating of 110 A and greater than approximately 9.1 A of said maximum current rating of 360 A.

2. The control system according to claim 1, wherein said current sense resistor is manufactured from 304/304L stainless steel bar stock (0.75 inches wide by 0.188 inches thick by 2.89 inches long) creating a low cost, 4-terminal, 250 µΩ resistor.

3. The control system according to claim 1, wherein said battery supervisor minimizes a risk of running said battery down to a point where it would be difficult to start said engine since a said winch on time is not allowed by said battery status circuit unless said state-of-charge of said battery is greater than approximately 42% and since said smart winch controller limits maximum energy taken from said battery during a complete said winch on time to be approximately 20% of said state-of-charge of said battery when said engine is not running, said battery is small (28 ampere-hours), said winch is large (330 A maximum current rating) and said winch current is maximum for 2.5 minutes (approximately 85 A), leaving sufficient energy for starting said engine.

4. The control system according to claim 1, wherein said second current sense circuit produces said third current sense voltage by combining a current sense output from each of three, paralleled, intelligent switches (that produce said winch drive output and are integral to said battery supervisor) in a resistor that is referenced to ground.

5. The control system according to claim 4, wherein said second latching circuit breaker circuit is integral to each of said three, paralleled, intelligent switches (that produce said winch drive output and are integral to said battery supervisor) and if a short circuit exists on said winch drive output, one of said three, paralleled, intelligent switches will latch first and is quickly followed by a latching of other two, paralleled, intelligent switches because said other two, paralleled, intelligent switches are suddenly delivering all of said short circuit current.

6. The control system according to claim 1, wherein said load compensation circuit combines said accessory current and said engine current (which may be charging or discharging said battery) to determine said net battery current for compensating for said internal resistance of said battery; said winch current is not included as part of said net battery current because said internal resistance of said battery, which is in series with resistance of wiring and wire connections of said winch, become difficult to predict at currents of 100 A or more; therefore, said battery status circuit ensures said sufficient energy exists in said battery before allowing a said winch on time and disabling said battery status circuit during said winch on time operated.

7. The control system according to claim 1, wherein said temperature compensation circuit is a diode connected transistor, for measuring ambient temperature, coupled through a peak detector which prevents decreasing a 600 mV reference voltage in said voltage measurement circuit, but allows a linear increase of said 600 mV reference voltage, for said ambient temperatures below approximately 70° F., to approximately 740 mV at −40° F.

8. The control system according to claim 1, wherein said state-of-charge comparator produces a signal, SOCGOOD, to turn said accessory drive output on when said SOCGOOD is a high voltage and off when said SOCGOOD is a low voltage and a voltage on a timing capacitor in said dual timer circuit turns said winch drive output off (provided said winch drive output is on) when said SOCGOOD is pending a possible said low voltage.

9. The control system according to claim 1, wherein said bias power for said battery supervisor is provided by a said fourth input from said ignition switch (for normal operation when said engine of said vehicle is running and producing a charge current) or by said toggle switch on said battery supervisor (for operation when said engine of said vehicle is not running).

10. The control system according to claim 1, wherein said battery supervisor has a low bias current, being typically less than 200 uA when said status indicator is green and said accessory drive output and said winch drive output are both off, and typically 17 mA when said status indicator is green and said accessory drive output and said winch drive output are both on.

11. The control system according to claim 1, wherein said hiccup mode, excessive voltage dip circuit uses a power-on-reset, integrated circuit to pull down a "wired-or" signal, ~RESET, for turning said winch drive output off when said battery voltage drops below a threshold of approximately 8.2V, and approximately 4 seconds after said battery voltage recovers to greater than approximately 8.2V, said winch drive output turns back on.

12. The control system according to claim 1, wherein said status indicator is a red-green-blue LED that can have no LEDs on to indicate no said battery connection or insufficient said state-of-charge of said battery, a red LED on to indicate a fault such as a reverse connection of said battery or said accessory drive output being latched off, a green LED on to indicate said accessory drive output and said winch drive output are both on, a said green LED on and a blue LED on, emitting an aqua color, to indicate said accessory drive output is on and said winch drive output is off or latched off and said red LED on and said blue LED on, emitting a purple color to indicate said accessory drive output is latched off and said winch drive output is off.

13. The control system according to claim 1, wherein said battery supervisor meets or exceeds an ambient temperature range of −40° F. (−40° C.) to +131° F. (+55° C.) (which an off-road vehicle can experience in normal use) by using components that meet or exceed an automotive operating temperature range of −40° C. to +125° C.

14. The control system according to claim 1, wherein said battery has a longer life since said battery status circuit prevents deep discharges of said battery by loads connected to at least one of said accessory drive or said winch drive outputs and because said deep discharges may cause permanent damage to said battery.

15. The control system according to claim 1, wherein said battery status circuit will continue to protect against a low state-of-charge of an aging said battery as said internal resistance of said battery gradually increases over time, since load compensation circuit of said battery status circuit will gradually provide insufficient said load compensation which will result in a premature indication that a low state-of-charge exists in said battery.

16. The control system according to claim 1, wherein said battery status circuit has a fast recovery, typically less than 2 minutes, overcoming a low state-of-charge level of said battery and returning to an acceptable state-of-charge level, the fast recovery occurring when said net battery current is charging said battery and said winch is not in said forced off time.

17. The control system according to claim 1, wherein said short term energy measurement circuit utilizes a surge current integral, "$I^2T$", as a measure of said energy limit that said winch can withstand without damage, where "I" is said winch current and "t" is time said winch is on and "$I^2t$" is calculated from said maximum current rating of said winch as "I" and "t"=10 seconds (often specified as the maximum said winch on time at said maximum current rating of said winch), the short term energy measurement circuit comprising:
  a precision multiplier integrated circuit that can "square" said third current sense voltage proportional to said winch current to produce an "$I^2$" term which is 733 mV full scale;
  a precision operational amplifier integrated circuit, as a precision analog integrator having a non-inverting input reference voltage of 7.74 mV, and having a rail-to-rail output, a common mode input voltage that exceeds a negative voltage rail, an input offset voltage of less than 100 µV and an input bias current of less than 1 nA;
  a capacitor, as said analog integrator capacitor, with tolerances equal to or better than a 40 µF±10% 50V X7R multilayer ceramic capacitor;
  a resistor, as said analog integrator input resistor, of 37.4 kΩ for generating said 2.5 minute timer, 38.225 kΩ for generating said 15 minute timer and 39.05 kΩ for generating said energy limit, "$I^2t$"; and
  an integrator output comparator with a positive going input threshold voltage of 4.8V and a negative going input threshold voltage of 0.2V for establishing an output voltage range of said analog integrator, wherein said analog integrator normally integrates from 5.0V to said 0.2V to determine said energy limit and immediately starting said forced off time of said winch.

18. The control system according to claim 1, wherein said 15 minute timer is generated by said short term energy measurement circuit by said analog integrator integrating from 0.2V to 4.8V to produce said forced off time of said winch which allows time for said electric winch system to cool down before allowing another said winch on time.

19. The control system according to claim 1, wherein said 2.5 minute timer is generated by said short term energy measurement circuit and is a maximum amount of time allowed for a said winch on time operating at any said winch current.

20. The control system according to claim 1, wherein said hiccup mode circuit breaker circuit uses a comparator that detects when said third current sense voltage exceeds approximately 130% of full scale (approximately 3.25V) and a power-on-reset integrated circuit to pull down said "wired-or" signal, ~RESET, for turning said winch drive output off, and after approximately 4 seconds, said winch drive output is turned back on.

21. The control system according to claim 1, wherein said smart winch controller anticipates a low threshold level of said state-of-charge may be pending by detecting when a voltage of a timer capacitor in said dual timer circuit exceeds approximately 63 mV and then shutting down said winch drive output, and wherein said voltage of said timer capacitor is approximately 211 mV for said 1 minute timer and approximately 1.3V for said 10 minute timer.

22. The control system according to claim 1, wherein said third current sense circuit is a comparator that determines when said winch is being operated by detecting said winch current that is greater than 0 A but less than 10 A (approximately 2.8 A for said maximum current rating of 110 A and approximately 9.1 A for said maximum current rating of 360 A), chosen to be less than any unloaded current rating of probable winches to be mounted on said vehicle, wherein said third current sense circuit then disables said battery status circuit by decreasing said 600 mV reference voltage for said voltage measurement circuit from typically 600 mV to approximately 318 mV.

23. The control system according to claim 1, wherein said first potentiometer is a gain adjustment for a current sense amplifier in said load compensation circuit that is set to match said ampere-hour rating (from 15 to 45 ampere-hours) of said battery installed on said vehicle, wherein said ampere-hour rating (as well as marine-cranking-amp rating) of said battery is a measure of said internal resistance of said battery and said internal resistance is required by said load compensation circuit.

24. The control system according to claim 1, wherein said second potentiometer is a gain adjustment for said third current sense voltage that is set to match said maximum current rating (from 100 A minimum to 360 A maximum) of said winch installed on said vehicle, wherein a proportional full scale range of said third current sense voltage is 2.5V for said smart winch controller.

* * * * *